(12) United States Patent
Asahi

(10) Patent No.: US 7,339,723 B2
(45) Date of Patent: Mar. 4, 2008

(54) OPTICAL TRANSMISSION SYSTEM, OPTICAL REPEATING APPARATUS, AND QUALITY SUPERVISING METHOD

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 81 days.

(21) Appl. No.: 11/090,785

(22) Filed: Mar. 25, 2005

(65) Prior Publication Data
US 2005/0220387 A1  Oct. 6, 2005

(30) Foreign Application Priority Data
Mar. 31, 2004  (JP) .............................. 2004-104628

(51) Int. Cl.
*H04B 10/17* (2006.01)
*H04J 14/00* (2006.01)
(52) U.S. Cl. ....................... 359/333; 398/181
(58) Field of Classification Search ............... 398/181; 359/333
See application file for complete search history.

(56) References Cited

U.S. PATENT DOCUMENTS 6,449,070 B1 * 9/2002 Izumi ........................... 398/79
6,634,807 B1 * 10/2003 Al-Salameh et al. ........... 398/9
7,151,630 B2 * 12/2006 Yamaguchi .................. 359/334
2002/0048062 A1 * 4/2002 Sakamoto et al. ........... 359/124
2002/0154358 A1 * 10/2002 Hino ........................... 359/124
2003/0035171 A1 * 2/2003 Touma ........................ 359/124
2003/0099032 A1 * 5/2003 Asao et al. ................ 359/341.4
2003/0152388 A1 * 8/2003 Uda et al. ...................... 398/97

* cited by examiner

*Primary Examiner*—Jack Keith
*Assistant Examiner*—Ari M. Diacou
(74) *Attorney, Agent, or Firm*—McGinn IP Law Group, PLLC

(57) ABSTRACT

An optical transmission system includes an optical fiber transmission line, one or more optical repeating apparatuses, an optical receiving apparatus, and a transferring route for transferring a supervisory signal based on a quality deterioration of an optical signal detected by the optical receiving apparatus to the optical repeating apparatus from the optical receiving apparatus. The optical repeating apparatus includes an optical level variation detecting unit for detecting a level variation of an optical signal and a level variation storing unit for storing information based on the level variation. The level variation storing unit sequentially discards a level variation information having passed a predetermined period while storing the level variation information in a constant interval, and holds storage of the level variation information from a time of storage of the level variation information based on a particular optical signal until a time controlled by the supervisory signal based on the particular optical signal transferred by the transferring route.

46 Claims, 10 Drawing Sheets

OPTICAL TRANSMISSION SYSTEM, OPTICAL REPEATING APPARATUS, AND QUALITY SUPERVISING METHOD

BACKGROUND OF THE INVENTION

1. Field of the Invention

The present invention relates to optical transmission communication and particularly to an optical transmission system connected with one or more optical repeating apparatuses, an optical repeating apparatus, and a quality supervising method for the same.

2. Description of Related Art

When deterioration in quality occurs in the service signal in the optical transmission system, a communication business company and a maintenance company of the communication facilities are required to search for a fault having generated such deterioration in transmission quality and to conduct the repair. However, if a level variation due to deterioration in transmission quality of service signal occurs momentarily, it is very difficult to identify the cause and defective area in the conventional optical transmission system. As an example of occurrence of a momentary level variation, stress is given in some cases to an optical fiber during the work in an optical line terminal.

FIG. 1 illustrates a structure of the conventional optical amplifying and repeating transmission system. The conventional optical amplifying and repeating transmission system comprises optical transmitters 901-1 to 901-n, optical amplifiers 902 to 905, optical receivers 906-1 to 906-n, a wavelength multiplexer 908, a wavelength demultiplexer 909, and optical fiber transmission lines 910 to 912. Numerals 921, 922 designate optical line terminals.

Next, with reference to FIG. 1, operations of the conventional optical amplifying and repeating transmission system will be described.

The optical transmitters 901-1 to 901-n in FIG. 1 output optical signals preset to the wavelengths $\lambda_1, \lambda_2, \ldots, \lambda_n$ in order to wavelength-multiplex. The outputted optical signals $\lambda_1, \lambda_2, \ldots, \lambda_n$ are wavelength-multiplexed with a wavelength multiplexer 908. The wavelength-multiplexed optical signals $\lambda_1$ to $\lambda_n$ are amplified at a time with the optical amplifier 902 and are then outputted to the optical fiber transmission line 910. The wavelength-multiplexed optical signals $\lambda_1$ to $\lambda_n$ which have been outputted are sequentially amplified with the optical amplifiers 903 to 905 in the course of transmission through the optical fiber transmission lines 910 to 912.

Accordingly, loss generated in the preceding optical fiber transmission line is compensated. The wavelength-multiplexed optical signals $\lambda_1$ to $\lambda_n$ which have been compensated in loss are then wavelength-demultiplexed with the wavelength demultiplexer 909 into the optical signals of single wavelengths $\lambda_1, \lambda_2, \ldots, \lambda_n$. The demultiplexed optical signals $\lambda_1, \lambda_2, \ldots, \lambda_n$ are respectively received with the optical receivers 906-1 to 906-n.

Therefore, this conventional optical amplifying and repeating transmission system realizes the optical amplifying and repeating transmission through wavelength-multiplexing of a plurality of optical signals via a single optical fiber transmission line.

FIG. 2 is a time chart when a fault is generated in the conventional optical amplifying and repeating transmission system. If optical signal is lost due to disturbance for the optical fiber transmission lines 910 to 912 (for example, loss increases because an external pressure is applied to the optical fiber) and a fault generated in the optical amplifiers 902 to 905, then a power waveform of optical signal 1001 shows a variation in level 1003 for the time axis. The time in which such variation in level 1003 is generated continues to the order of 1 msec, in the shortest case, from the order of 100 msec.

As a method of supervising a bit error generated by such variation in optical signal at the optical line terminal in the receiving side, the method disclosed in "ITU-T Recommendation G. 783" has been known.

In order to detect such a fault, a means for detecting the level of optical signal being transmitted is provided within each optical amplifier in the conventional optical amplifying and repeating transmission system. Levels of the optical signals are supervised as described above. However, limitation is set to the capacity of memory for storing such supervisory information and the time for storing the same in the conventional optical amplifying and repeating transmission system.

Accordingly, as illustrated in FIG. 2, an interval (detection interval) Ts of the supervisory point 1002 has generally been set to about several tens of minutes. Therefore, if instantaneous level variation is generated in the order of about 100 msec from the order of 1 msec like the level variation 1003 at the time other than the supervisory point 1002, such level variation has not been detected. Therefore, if deterioration of signal quality is generated at the receiving terminal, it has been difficult to identify the cause and defective point.

In other words, an optical signal level is detected by an optical signal level detecting means provided in each optical amplifier 902 to 905. The detected information (optical signal level) is accumulated within the memory provided in each optical amplifier. Momentary optical level variation can be detected by setting the interval (detection interval) of the supervisory point 1002 in the detecting means as short as possible. However, an amount of accumulation (capacity) of memory is limited and period of accumulation is also limited.

Accordingly, if the detection interval is set short, then a detection amount exceeds the capacity of memory. Therefore, the detection interval can generally be set only to several tens of minutes, and thereby it has been difficult to detect momentary variation in the signal level. FIG. 2 also shows an example of no-detection that level variation 1003 is generated within the detection interval Ts (about several tens of minutes).

Even if such momentary level variation is generated, this level variation causes generation of a bit error at the optical receiving terminal. Therefore, prior to the invention, there has been no method of detecting momentary level variation in each optical amplifier provided in the optical fiber transmission line in the preceding stage of the optical receiving terminal.

SUMMARY OF THE INVENTION

In view of the foregoing and other exemplary problems, drawbacks, and disadvantages, an exemplary feature (aspect) of the present invention is to provide an optical transmission system, an optical repeating apparatus, and a quality supervising method of the same to detect a momentary level variation and effectively store such level variation.

An exemplary optical transmission system includes an optical fiber transmission line, one or more optical repeating apparatuses, an optical receiving apparatus, and a transferring route for transferring a supervisory signal based on a quality deterioration of an optical signal detected by the optical receiving apparatus to the optical repeating apparatus from the optical receiving apparatus.

The optical repeating apparatus includes an optical level variation detecting unit for detecting a level variation of an optical signal and a level variation storing unit for storing information based on the level variation. The optical receiving apparatus includes a quality deterioration detecting unit for detecting a quality deterioration of an optical signal.

The level variation storing unit sequentially discards the information of the level variation having passed a predetermined period while storing the information of the level variation in a constant interval. The level variation storing unit holds storage of the information of the level variation from a time when the level variation storing unit has stored the information of the level variation based on a particular optical signal detected by the optical level variation storing unit until a time when the level variation storing unit is controlled by the supervisory signal based on the particular optical signal transferred by the transferring route.

As described above, the optical transmission system of the present invention sequentially discards the level variation information after a predetermined period while it is storing the same information in a constant interval with the level variation storing unit. The level variation storing unit holds storage of at least level variation information from a time when the level variation information of a particular optical signal is stored until a time controlled by the supervisory signal based on same particular optical signal. Therefore, the level variation storing unit sequentially discards the level variation information not required for identification of the cause of fault and holds the level variation information required for identification of the cause of fault. Accordingly, a defective area and a cause of defect can be identified. Since the level variation storing unit effectively stores level variation, if the storage interval is set short, momentary level variation can be detected without occurrence of any overflow of the memory capacity.

The exemplary optical transmission system of the present invention may be provided with the following and other exemplary characteristics.

The level variation storing unit does not to discard the level variation information, but to hold storage of the same information stored in that period on the basis of the supervisory signal received from the supervisory signal transferring route.

The storage period of the level variation information in the level variation storing unit is set, for the particular optical signal, longer than the period determined by summing the time until detection of quality deterioration in the quality deterioration detecting unit from storage of the level variation information in the level variation storing unit after detection of level variation in the optical level variation detecting unit and the time until control of storage of the level variation storing unit after transfer of the supervisory signal through the supervisory signal transferring route from detection of quality deterioration in the quality deterioration detecting unit.

Otherwise, the storage capacity of the level variation information in the level variation storing unit is larger, for the particular optical signal, the total sum of data generating level variation detected within the period determined by summing the time until detection of quality deterioration in the quality deterioration detecting unit from storage of the level variation information in the level variation storing unit after detection of level variation in the optical level variation detecting unit and the time until control of storage of the level variation storing unit after transfer of the supervisory signal through the supervisory signal transferring route from detection of quality deterioration in the quality deterioration detecting unit.

The quality deterioration detecting unit includes an optical level detecting unit for detecting level of optical signal and a signal quality detecting unit for detecting quality of optical signal. The signal quality detecting unit detects shutdown of the received signal, frame asynchronization of the received signal, or bit error of the received signal.

The level variation storing unit reads the level variation information from an outside. The level variation storing unit is formed as a memory. Moreover, the memory includes a primary memory for storing a predetermined period the level variation information and a secondary memory for storing the level variation information by shifting from the primary memory when the supervisory signal is received.

The optical repeating apparatus further includes an optical amplifying unit. Moreover, the optical repeating apparatus also includes a status detecting unit for detecting status of the optical amplifying unit.

The optical transmission system performs the wavelength multiplex transmission. The quality deterioration detecting unit is provided for every individual wavelength. Moreover, the system also includes a wavelength demultiplexer for demultiplexing the wavelength-multiplexed optical signal to the optical signals of individual wavelength and then inputting the demultiplexed optical signal of individual wavelength to the quality deterioration detecting unit.

The optical transmission system also includes an operation terminal for supervising the optical repeating apparatus. Moreover, the system also includes an interface for coupling the operation terminal and optical repeating apparatus.

The optical transmission system utilizes an opposite line as the supervisory signal transferring route. Moreover, the system also includes a transferring unit of supervisory wavelength signal for transmitting the supervisory signal to the opposite line.

The optical transmission system also is provided with an optical cross-connect function and a matrix optical switch for switching the transmission route.

An exemplary optical repeating apparatus connected in an optical fiber transmission line includes an optical level variation detecting unit for detecting level variation of one or more optical signals, and a level variation storing unit for storing information of the level variation. The level variation storing unit sequentially discards the level variation information having passed a predetermined period while storing the level variation information in a constant interval, and does not discard but hold the information of the level variation being stored at the time when a supervisory signal is received from an outside.

As described above, the optical repeating apparatus of the present invention sequentially discards the level variation information having passed a predetermined period, while it is storing the same information in a constant interval with the level variation storing unit. Here, when the level variation storing unit receives the supervisory signal from outside, the level variation storing unit does not to discard the level variation information stored at that time but hold the same information. Accordingly, the level variation storing unit sequentially discards the level variation information not required for identifying a cause of fault and holds the level variation information required for identifying a cause of fault. Therefore, a defective area and a cause of defect can be identified. In addition, since the level variation storing unit holds effectively level variation, it can detect momentary level variation without occurrence of overflow of capacity even if storage interval is shortened.

Moreover, the optical repeating apparatus of the present invention may be provided with the following and other exemplary characteristics.

The level variation storing unit can read the level variation information from an outside. The level variation storing unit is formed as an ordinary memory. Moreover, this memory includes a primary memory for storing the level variation information for a predetermined period and a secondary memory for storing the level variation information by shifting from the primary memory when the memory is controlled with the supervisory signal.

The optical repeating apparatus further includes an optical amplifying unit and a status detecting unit for detecting the status of the optical amplifying unit. The status information of the optical amplifying unit from the status detecting unit is stored in the level variation storing unit like the level variation information.

The optical repeating apparatus also includes an operation terminal for supervising the optical repeating apparatus and an interface for coupling the operation terminal and optical repeating apparatus.

An exemplary quality supervising method of an optical transmission system in which optical repeating apparatuses are connected to an optical fiber transmission line includes an optical level variation detecting for detecting level variation of optical signals in the optical repeating apparatus, a level variation storing for storing information of the level variation, a quality deterioration detecting for detecting quality deterioration of optical signals transmitted through the optical fiber transmission line via the optical repeating apparatus, and a supervisory signal transferring for transferring the supervisory signal to the optical repeating apparatuses. The level variation storing sequentially discards the information of the level variation having passed a predetermined period while storing the information of the level variation in a constant interval. The level variation storing holds storage of the information of the level variation from a time of storage of the information of the level variation of a particular optical signal until a time controlled by the supervising signal on the basis of the particular optical signal.

As described above, in the exemplary quality supervising method of the optical transmission system of the present invention, the level variation storing sequentially discards the level variation information having passed a predetermined period while it is storing the level variation information in a constant interval. The level variation storing holds storage of at least level variation information from a time when the level variation information of a particular optical signal is stored until a time controlled by the supervisory signal based on same particular optical signal. Accordingly, in the level variation storing, the level variation information not required for identifying a cause of a fault is sequentially discarded and the level variation information required for identifying a cause of a fault is stored. Thereby, a defective area and a cause of defect can be identified. Since the level variations are effectively held in the level variation storing, a momentary level variation can be detected without occurrence of overflow of capacity even if the storage interval is shortened.

BRIEF DESCRIPTION OF THE DRAWINGS

The above and other exemplary aspects, features and advantages of the present invention will become more apparent from the following detailed description when taken in conjunction with the accompanying drawings wherein.

DETAILED DESCRIPTION OF THE EXEMPLARY EMBODIMENTS

The exemplary embodiments of the present invention will be described below in detail with reference to the accompanying drawings.

A structure of the optical transmission system as a first exemplary embodiment of the present invention will be described with reference to FIG. 3 to FIG. 6.

Figure 1:
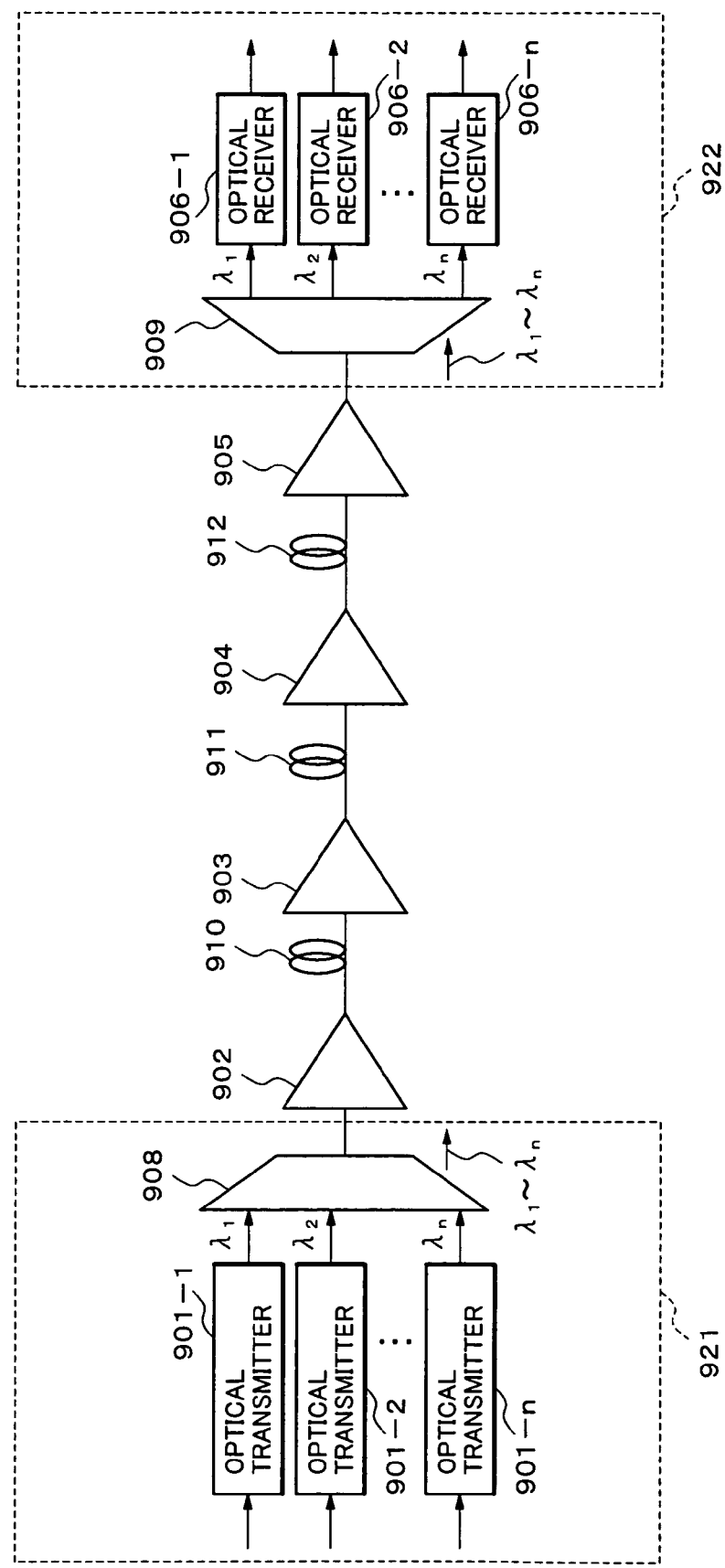
FIG. 1 is a structural diagram illustrating a conventional optical amplifying and repeating transmission system.
Figure 2:
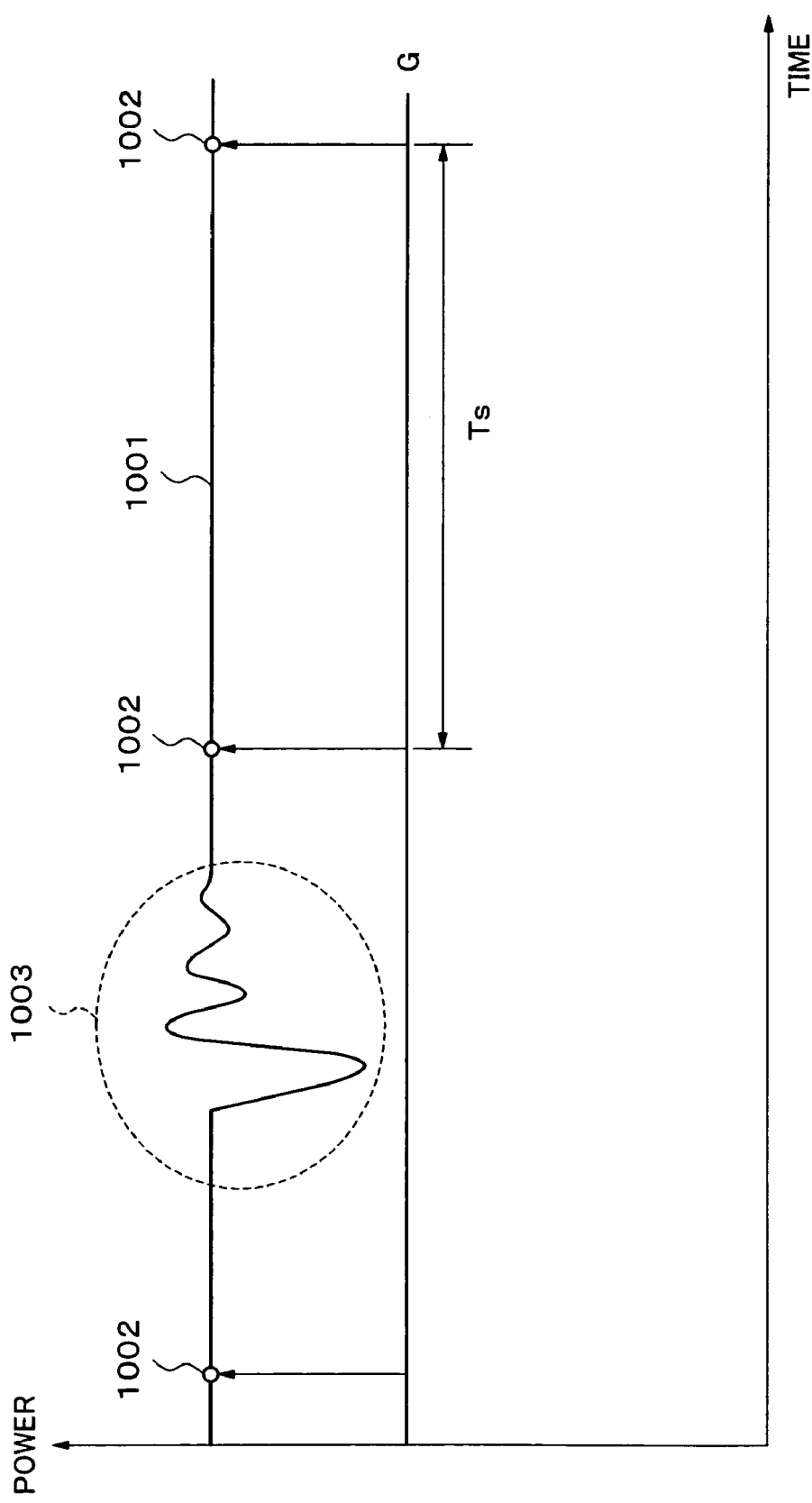
FIG. 2 is a diagram illustrating a time-chart when a fault is generated in the conventional optical amplifying and repeating transmission system.
Figure 3:
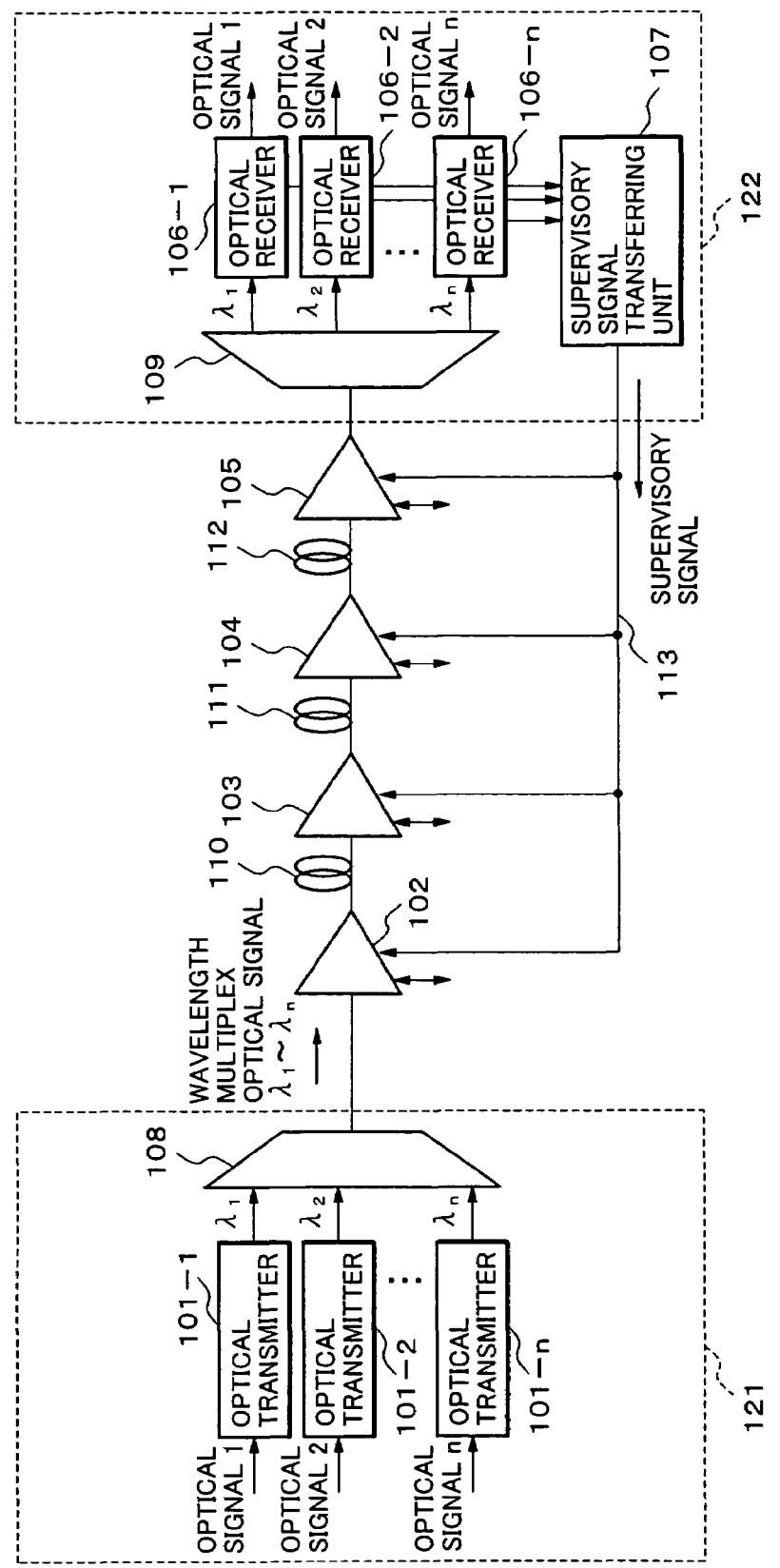
FIG. 3 is a structural diagram illustrating a first exemplary embodiment of the present invention.

FIG. 3 illustrates a structure of the optical transmission system of the first exemplary embodiment of the present invention. This optical transmission system includes optical transmitters 101-1 to 101-n, optical amplifiers 102 to 105 as examples of the optical repeating apparatus, optical receivers 106-1 to 106-n, a supervisory signal transferring unit 107, a wavelength multiplexer 108, a wavelength demultiplexer 109, optical fiber transmission lines 110 to 112, and a supervisory signal transferring route 113. Numerals 121, 122 designate optical line terminals. FIG. 3 is an example where the number of optical amplifiers is set to 4. The number of optical amplifiers may be increased or decreased in accordance with the transmission distance. Moreover, FIG. 3 illustrates an example of application into the optical transmission system of the wavelength-multiplexing. The present invention may also be applied to the optical transmission system of a single wavelength.

Figure 4:
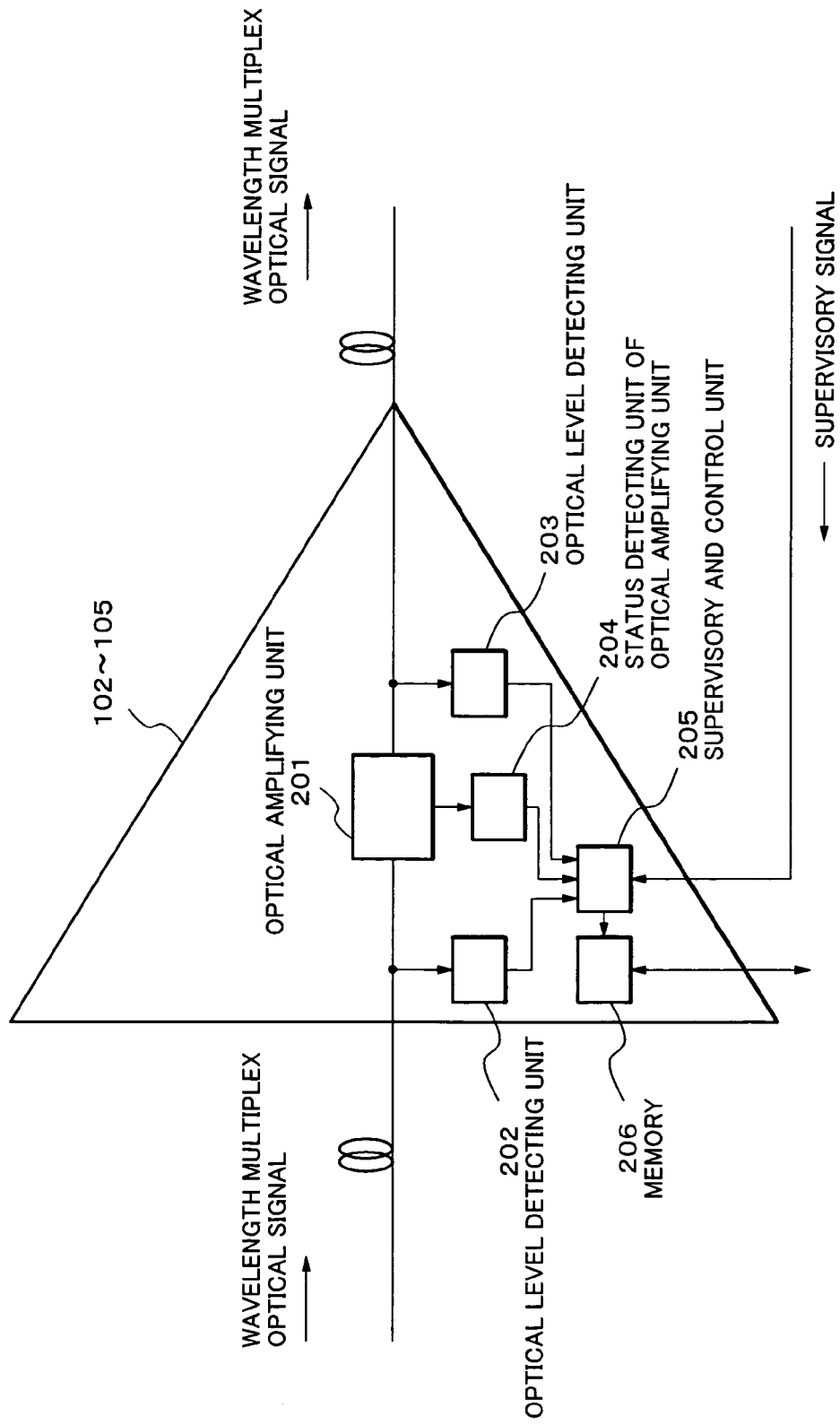
FIG. 4 is a structural diagram illustrating an internal side of an optical amplifier in the first exemplary embodiment of the present invention.

FIG. 4 illustrates a structure of the optical amplifiers 102 to 105 illustrated in FIG. 3. These optical amplifiers 102 to 105 respectively comprise an optical amplifying unit 201, optical level detecting units 202, 203, an optical amplifying unit status detecting unit 204, a supervisory and control unit 205, and a memory 206.

Figure 5:
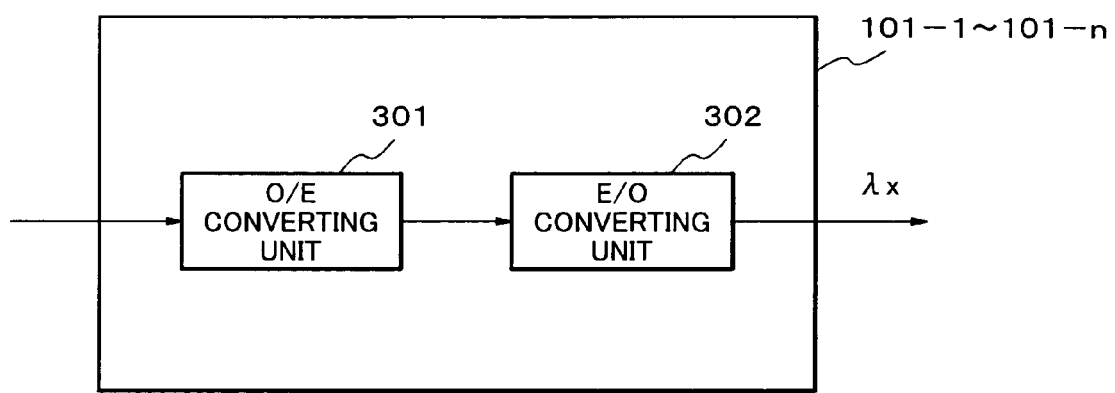
FIG. 5 is a structural diagram illustrating an internal side of an optical transmitter in the first exemplary embodiment of the present invention.

FIG. 5 illustrates a structure of optical transmitters 101-1 to 101-n illustrated in FIG. 3. These optical transmitters 101-1 to 101-n respectively comprise an opto-electrical (O/E) converting unit 301 and an electro-optical (E/O) converting unit 302.

Figure 6:
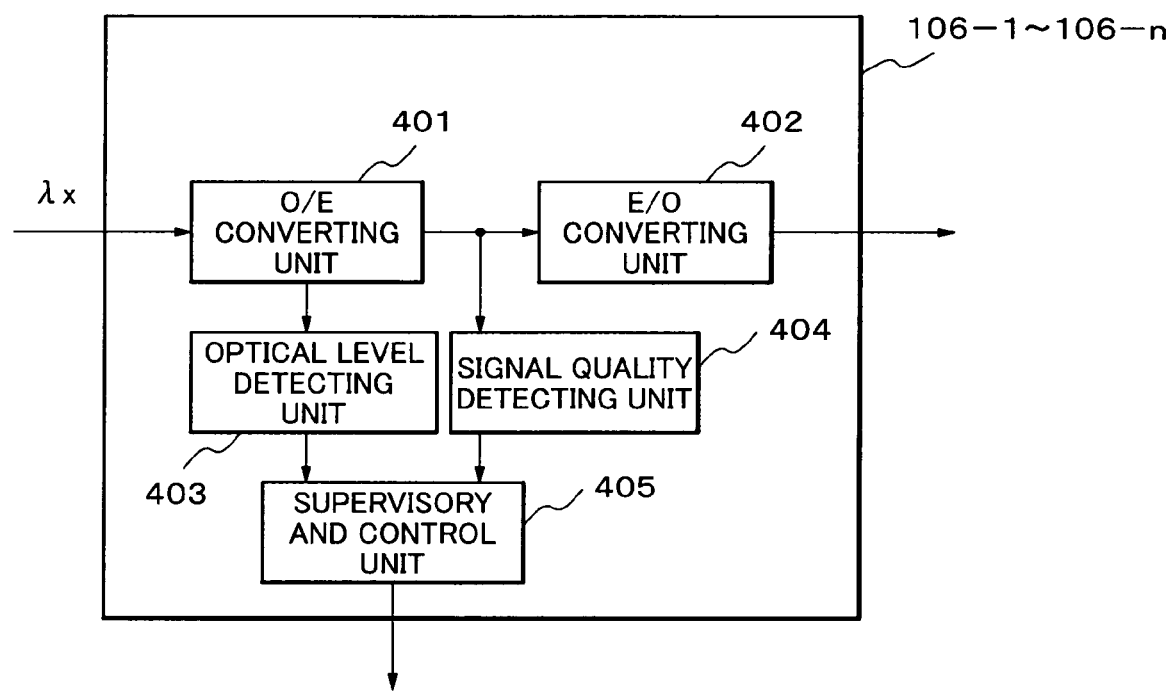
FIG. 6 is a structural diagram illustrating an internal side of an optical receiver in the first exemplary embodiment of the present invention.

FIG. 6 illustrates a structure of optical receivers 106-1 to 106-n illustrated in FIG. 3. The optical receivers 106-1 to 106-n respectively comprise an opto-electrical (O/E) converting unit 401, an electro-optical (E/O) converting unit 402, an optical level detecting unit 403, a signal quality detecting unit 404, and a supervisory and control unit 405.

Next, operations of the optical transmission system of the first exemplary embodiment of the present invention will be described with reference to FIG. 3 to FIG. 6. First, operations of the optical signal in the optical repeating transmission will be described. In FIG. 3, the optical signals 1 to n inputted to the optical transmitters 101-1 to 101-n are once converted into the electrical signals in the O/E converting unit 301 of FIG. 5 and are subjected to the predetermined processes such as waveform compensation and modulation or the like.

Thereafter, these signals are then converted again to the optical signals in the E/O converting unit 302. The optical signals outputted from the E/O converting unit 302 are set to the predetermined different wavelengths for the wavelength-multiplexing in the wavelength multiplexer 108. The optical transmitters 101-1 to 101-n are not always required to provide the O/E converting unit 301 and the function to convert the optical signal into the electrical signal. In this case, an electrical signal is inputted to the optical transmitters 101-1 to 101-n.

Next, the optical signals $\lambda_1, \lambda_2, \ldots, \lambda_n$ of different wavelengths outputted from the optical transmitters 101-1 to 101-n are wavelength-multiplexed with the wavelength multiplexer 108 to become the wavelength-multiplexed signals $\lambda_1$ to $\lambda_n$. The wavelength-multiplexed optical signals $\lambda_1$ to $\lambda_n$ are simultaneously amplified with the optical amplifier 102 and are then outputted to the optical fiber transmission line 110. Moreover, the wavelength-multiplexed signals $\lambda_1$ to $\lambda_n$ transmitted through the optical fiber transmission line 110 are respectively amplified with the optical amplifiers 103 to 105. Accordingly, loss generated in the just preceding optical fiber transmission lines 110 to 112 is compensated.

Next, the wavelength-multiplexed signals $\lambda_1$ to $\lambda_n$ are wavelength-demultiplexed in the wavelength demultiplexer 109 for demultiplexing into the optical signals $\lambda_1, \lambda_2, \ldots, \lambda_n$ of the single wavelength. The demultiplexed optical signals of single wavelength $\lambda_1, \lambda_2, \ldots, \lambda_n$ are received by the optical receivers 106-1 to 106-n. The received optical signals $\lambda_1, \lambda_2, \ldots, \lambda_n$ are once converted to the electrical signals in the O/E converting unit 401 of FIG. 6 for implementation of the predetermined process such as waveform compensation or the like.

Moreover, each electrical signal is converted again, as required, to the optical signal with the E/O converting unit 402 and is then outputted. The optical receivers 106-1 to 106-n are not always required to provide the E/O converting unit 402 and a function to convert the electrical signal to the optical signal. In this case, the electrical signal is outputted from the optical receivers 106-1 to 106-n.

As described above, in the first exemplary embodiment of the present invention, the optical repeating transmission can be realized through a single optical fiber transmission line by wavelength-multiplexing of a plurality of optical signals.

Next, operations of the supervisory and control system in the optical transmission system as the first exemplary embodiment of the present invention will be described.

As illustrated in FIG. 6, the optical level detecting unit 403 provided respectively in the optical receivers 106-1 to 106-n detects level variations of the received optical signals. Moreover, the signal quality detecting unit 404 detects deterioration in quality such as bit error of the received optical signal. Detection of bit error can be realized by detecting the parity signal which is previously embedded in the header of the transmitting signal (as an example, Bit interleaved Parity information (1) of Synchronous Digital Hierarchy), and code violation (as an example, 8B10B code or 64B/66B code of the Giga Bit Ethernet (registered trademark) signal and 10 Giga Net Ethernet (registered trademark) signal, or the like). Detailed description of the detection of signal quality is omitted here. The signals from these optical level detecting unit 403 and signal quality detecting unit 404 are outputted to the supervisory and control unit 405. The supervisory and control unit 405 supervises these signals and outputs the signals as the supervisory signal (information of quality deterioration) to the supervisory signal transferring route 113 via the supervisory signal transferring unit 107 of FIG. 3. Moreover, the supervisory signal outputted to the supervisory signal transferring route 113 is then transferred to the optical amplifiers 102 to 105, respectively.

As illustrated in FIG. 4, the optical level detecting units 202, 203 respectively provided in the optical amplifiers 102 to 105 detect optical level variation. Such optical level variation is generated by disturbance (for example, increase of loss due to external pressure applied to the optical fiber) which the wavelength-multiplexed and transmitted signal receives in the preceding optical fiber transmission lines 110 to 112.

Moreover, the status detecting unit 204 of the optical amplifier detects change in status of the optical amplifying unit 201 (for example, fault of a pumping laser and change in current, or the like). These detected information pieces are transmitted, together with a time stamp, to the supervisory and control unit 205 and are then accumulated in the memory 206.

Meanwhile, in FIG. 3, level variation and deterioration in quality of the optical signals detected by the optical receivers 106-1 to 106-n are transmitted, as the supervisory signal, to the supervisory signal transferring route 113 via the supervisory signal transferring unit 107. In addition, the supervisory signal is received by the supervisory and control unit 205 of the optical amplifiers 102 to 105 via the supervisory signal transferring route 113. The supervisory and control signal 205 controls the detected information (storage) of the memory 206 on the basis of this supervisory signal. Sustaining or abolition of the detected information accumulated at this time can be controlled by it. Moreover, the detected and accumulated information may be analyzed, for example, through transmission to the outside.

When the detected information stored in the memory is transmitted to the outside, transmission process capability of network is likely restricted in some cases. The reason is that when a large amount of the detected information is transmitted at a time, the network for supervising is likely to become unstable. In view of avoiding such event, the memory 206 may be formed of two kinds of memories of the primary memory and secondary memory. The detected information is once stored in the first memory and then is shifted to the secondary memory. The detected information stored in this secondary memory can be extracted at the desired time from the outside (operation terminal, or the like). In practice, the primary memory always stores the detected information of a predetermined period. On the basis of the received supervisory signal, the primary memory shifts the accumulated detected information to the secondary memory. On the other hand, the secondary memory receives at a time the detected information from the primary memory, permitting the read operation as required from the outside.

Figure 7:
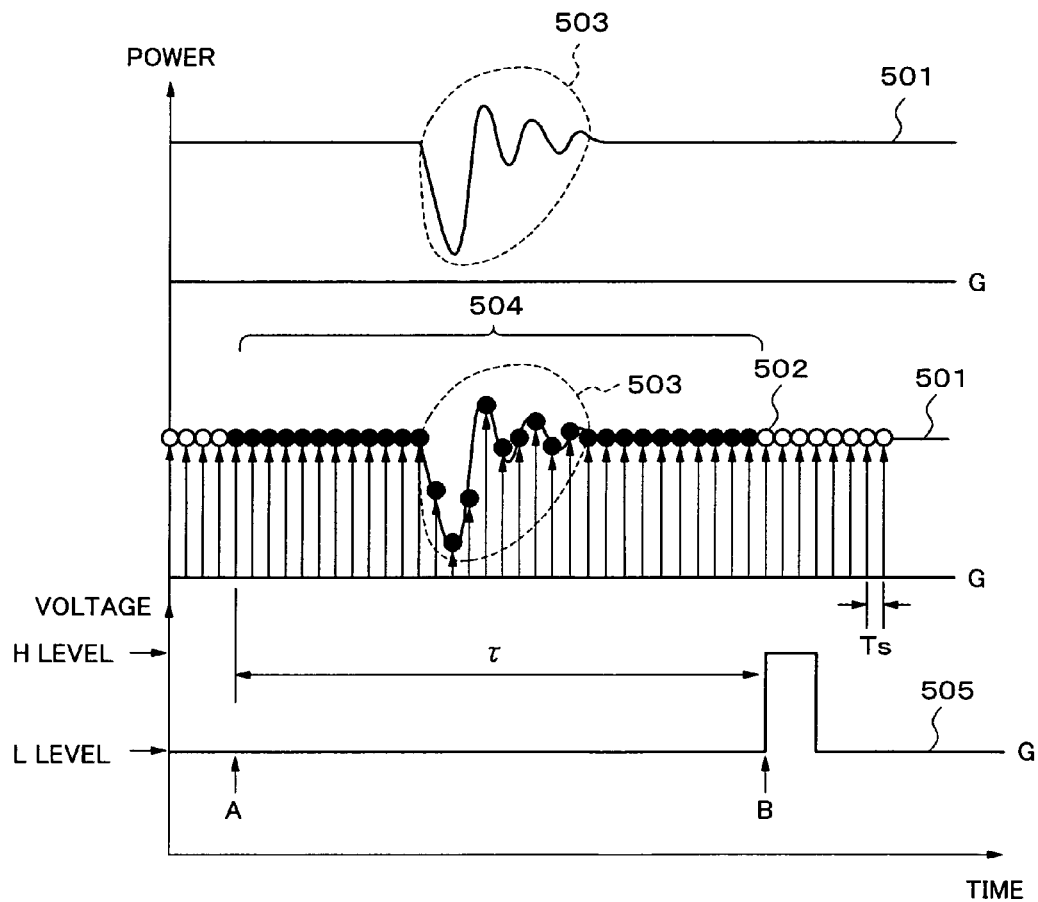
FIG. 7 is a diagram illustrating a time-chart in the first exemplary embodiment of the present invention.

Next, an exemplary method for supervising optical transmission quality in the first exemplary embodiment of the present invention will be described with reference to the time chart of FIG. 7. In the optical transmission system, the optical signal being transmitted is likely to have a level variation like the power waveform 501 of FIG. 7 due to disturbance to the optical fiber transmission line and fault of optical amplifier. The power waveform 501 of FIG. 7 is detected by the optical level detecting units 202, 203 in the optical amplifier. Otherwise, the power waveform 501 is detected by the status detecting unit 204 which is detecting status change of the optical amplifier.

In practice, when a level variation is generated in the optical fiber transmission line or the like in the preceding stage of the optical level detecting unit 202 in FIG. 4, a level variation is detected after the optical level detecting unit 202. Moreover, if level variation is generated after the optical level detecting unit 202 but before the optical level detecting unit 203, level variation is detected after the optical level detecting unit 203.

Moreover, if a level variation is generated in the optical fiber transmission line or the like in the subsequent stage of the optical level detecting unit 203, a level variation is detected after the optical level detecting unit 202 provided within the next optical amplifier. A detection interval is set to the detection interval Ts which is sufficiently shorter than the level variation (due to disturbance to the optical fiber transmission line and fault of optical amplifier) momentarily generated in the optical transmission system as illustrated in FIG. 7.

Accordingly, the power waveform 501 is respectively supervised at the supervising point 502. The power waveform 501 is supervised by sampling with detection interval Ts. The detection interval Ts is set shorter by the 100 msec order from the 1 msec order which is the level variation time generated momentarily in the optical transmission system. This value is, for example, up to the order of 100 msec from the order of 1 μsec, particularly up to the order of 1 msec from the order of 1 μsec.

If level variation as illustrated by a power transition waveform 503 of FIG. 7 is generated, then it will possibly generate deterioration in signal quality after transmission. Signal quality is detected, as illustrated in FIG. 3 and FIG. 6, with the optical level detecting unit 403 and the signal quality detecting unit 404 provided in the optical receivers 106-1 to 106-n. Moreover, the signal quality is indicated as a transmission quality waveform 505 of FIG. 7. The "L" level indicates the high quality state, while the "H" level, the deteriorated quality state. This transmission quality waveform 505 is transmitted to the optical amplifiers 102 to 105 by the supervisory signal transferring unit 107.

In the transmission quality waveform 505, level change is triggered to the "H" level from the "L" level with deterioration in quality of the received optical signal. In practice, such status change is triggered by: (1) shutdown of received signal (detected by the optical level detecting unit 403 of FIG. 6) in which optical signal level is lowered up to the level disabling reception of signal; (2) frame asynchronization of the received signal (detected by the signal quality detecting unit 404 of FIG. 6) in which the frame synchronization information of Synchronous Digital Hierachy, or the frame synchronization information based on 8B10B code, 64B/66B code or the like of the Ethernet (registered trademark) signal can no longer be recognized; and (3) bit error of the received signal (detected by the signal quality detecting unit 404 of FIG. 6) in which the Bit Interleaved Parity information of Synchronous Digital Hierarchy, or the code violation based on 8B10B code, 64B/66B code or the like of the Ethernet (registered trademark) signal is detected.

Here, the information detected by the optical level detecting units 202, 203 and status detecting unit 204 of the optical amplifying unit illustrated in FIG. 4 is transferred to the supervisory and control unit 205 together with the time stamp. The detected information is accumulated in the memory 206.

The detection interval is defined as Ts, as described above, which is sufficiently shorter than level variation momentarily generated in the optical transmission system. The memory 206 has the capacity for accumulating the amount of detected information for the period which is longer than the time attained by adding the time α and the time β indicated below.

The time α is defined as the period from the point of time when a certain optical signal is detected in its level by the optical level detecting units 202, 203 or the like of the optical amplifiers 102 to 105 and it is then stored in the memory 206 via the supervisory and control unit 205 until the point of time when this optical signal is transmitted and transmission quality of the same optical signal is detected by the optical level detecting unit 403 or the detection unit of signal quality 404 of the optical receivers 106-1 to 106-n.

The time β is defined as the period from the point of time when a level variation of the optical signal is detected by the optical level detecting unit 403 or when transmission quality is detected by the signal quality detecting unit 404 until the point of time when the transmission quality information is transferred, as the supervisory signal (information of quality deterioration), to the supervisory and control unit 205 provided in the optical amplifiers 102 to 105 via the supervisory and control unit 405 and the supervisory signal transferring unit 107. Thus, the supervisory and control unit 205 controls the memory 206.

Namely, the memory 206 accumulates the detected information for the period longer than the period from the point of time when the level variation information of a certain optical signal is stored in each optical amplifier until the point of time when the information of quality deterioration resulting from the same optical signal is detected in the optical receiver and transferred, and the memory is controlled by the information. Moreover, the memory 206 has the capacity enough to accumulate the amount of information detected within the above period.

The memory 206 has the capacity enough to accumulate the total sum of the data detected for the time τ in the detection interval Ts. In other words, the memory 206 always accumulates the new information in the detection interval Ts. On the other hand, it discards the information from the older one accumulated in the past. The memory 206 always accumulates the amount of information for the time τ.

Accordingly, when level variation or quality deterioration are detected with the optical level detecting unit 403 or the signal quality detecting unit 404 provided within the optical receivers 106-1 to 106-n, the information of quality deterioration is transferred, as the supervisory signal, to the supervisory and control unit 205 provided in the each optical amplifiers 102 to 105 via the supervisory and control unit 405 and the supervisory signal transferring unit 107.

The supervisory and control unit 205 controls the memory 206 to output to the outside the level variation information which has been accumulated by tracing up the time τ from reception of the supervisory signal.

Accordingly, the level variation information pieces of the optical level detecting units 202, 203 and the status detecting unit 204 of the optical amplifier accumulated in the memory 206 are outputted respectively to identify the detective area and cause of fault. In practice, when a level variation is verified after the optical level detector 202, it means that a fault is generated in the preceding optical fiber transmission line. A cause of a fault such as a break of fiber can be identified by searching the particular section of the optical fiber transmission line.

Moreover, when level variation is confirmed in the status detecting unit 204 of the optical amplifying unit, it means a fault is generated within the optical amplifying unit. A cause of fault such as irregular output of the pumping light source can be identified by searching the particular section. Moreover, when level variation is checked after the optical level detecting unit 203, it means that a fault is generated between the optical level detecting unit 202 and the optical level detecting unit 203. A cause of fault such as break of fiber or the like can also be identified by searching the particular section.

In other words, when quality deterioration is detected by the optical receivers 106-1 to 106-n at the time B of FIG. 7, the quality deterioration waveform 505 becomes "H" level at the time B. The supervisory signal (information of quality deterioration) is transferred to each optical amplifier from the optical receiver. The memory 206 provided in the optical amplifier stores, together with the time stamp, the sampled waveforms stored in the memory 504 up to the time A traced back by the time τ from the time B (black circles in the figure detected in the detection interval Ts).

On the basis of this detected information, level variation such as the power transition waveform 503 which causes quality deterioration can be identified. Moreover, the defective area can be confirmed by the supervisory and control unit 205 provided in each optical amplifier. The supervisory and control unit 205 identifies a section in which a fault is generated by checking respective variations of the optical level detecting units 202, 203 and status detecting unit 204.

Here, it is preferable that the detection interval Ts is sufficiently shorter than momentary level variation occurring in the optical transmission system as mentioned above. Accordingly, level variation as a cause of fault can surely be detected. Moreover, it is also preferable that the storing time τ is set sufficiently longer than the time attained by adding the times α and β described above in order to surely store the power transition waveform 503 as a cause of fault. Therefore, level variation as a cause of fault can surely be detected. Here, the memory 206 is enough when it has the capacity for accumulating the detected information detected in the detection interval Ts only for the storing time τ. Accordingly, if the detection interval is set shorter than the conventional one, then the capacity required can be reduced.

In addition, the supervisory and control unit 205 controls, based on the supervisory signal, the memory 206 not to discard, but to hold the level variation information being stored at that time. Moreover, the supervisory and control unit 205 may also control, based on the supervisory signal, not to transfer the new level variation information to the memory 206 from the optical level detectors 202, 203 and the status detecting unit 204 of the optical amplifying unit.

Further, it is also possible that the sampled waveforms 504 stored in the memory 206 of the optical amplifiers 102 to 105 (black circles in FIG. 7) are read responding to the request from the outside. Therefore, an administrator is capable of conducting detailed searches from the optical line terminal or the like.

As described above, in the optical transmission system of the first exemplary embodiment of the present invention, a level variation waveform can surely be detected by performing the sampling in the shorter detection interval than the conventional one. Moreover, regarding the accumulation amount of memory, when sufficient amount of accumulation for detection, during the time τ is acquired, the information about fault can be accumulated completely. Accordingly, a cause of fault and defective area can be identified from the level variation waveform detected in detail.

Figure 8:
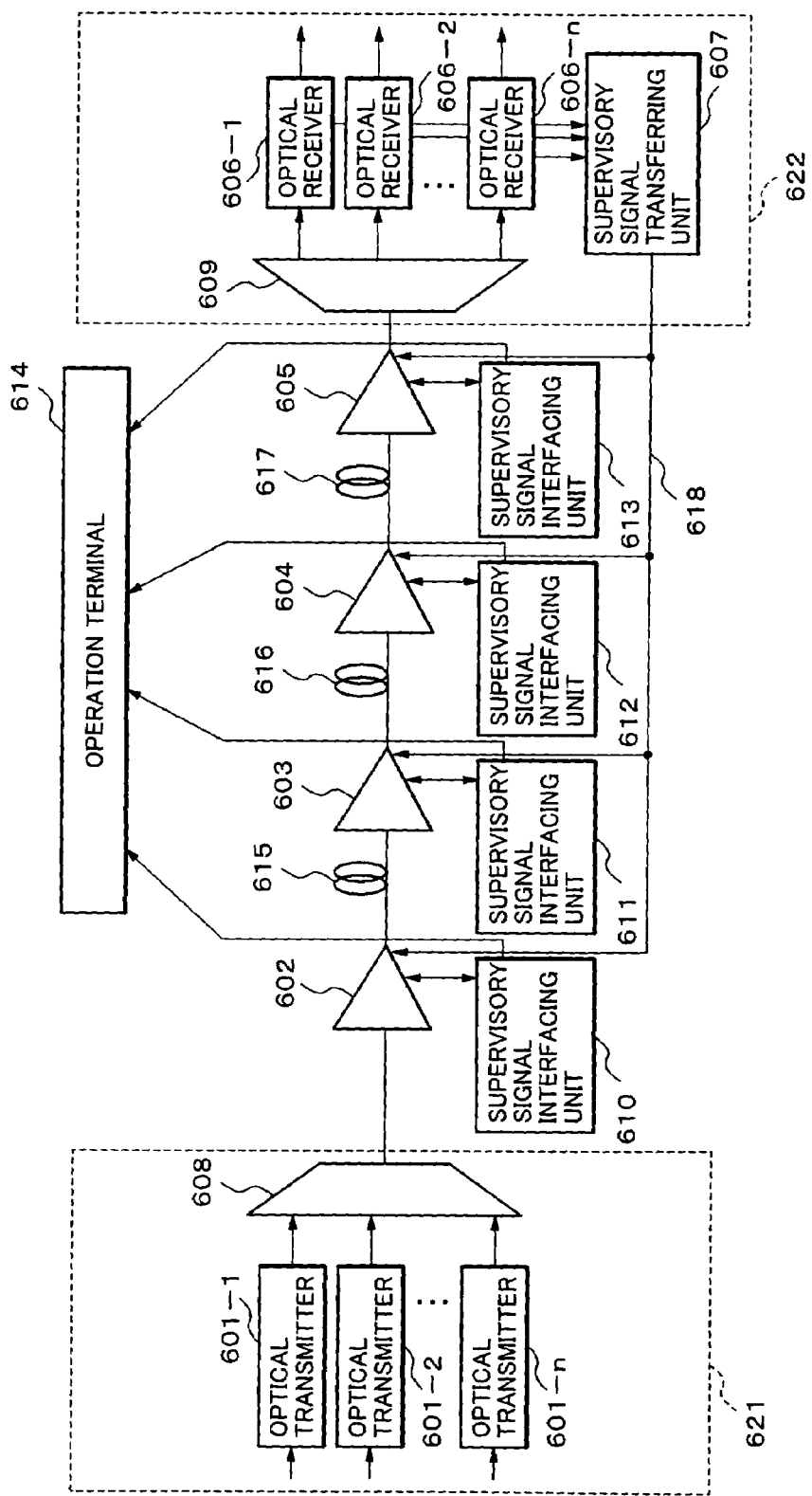
FIG. 8 is a structural diagram illustrating a second exemplary embodiment of the present invention.

A structure of the optical transmission system of a second exemplary embodiment of the present invention is illustrated in FIG. 8.

As illustrated in FIG. 8, this optical transmission system includes optical transmitters 601-1 to 601-n, optical amplifiers 602 to 605 as an example of optical repeating apparatus, optical receivers 606-1 to 606-n, a supervisory signal transferring unit 607, a wavelength multiplexer 608, a wavelength demultiplexer 609, supervisory signal interfacing units 610 to 613, an operation terminal 614, optical fiber transmission lines 615 to 617, and a supervisory signal transferring route 618. Numerals 621, 622 designate optical line terminals.

Next, operations of the optical transmission system of the second exemplary embodiment of the present invention will be described with reference to FIG. 8.

This second exemplary embodiment is similar to the first exemplary embodiment until the step in which level variation waveform resulting from disturbance to the optical fiber and fault of apparatus is stored to the memory of the optical amplifiers 602 to 605. In addition, in this embodiment, the level variation waveform stored in the memory is transmitted to the operation terminal 614 automatically or responding to the request from the operation terminal 614 via the supervisory signal interfacing units 610 to 613. Such level variation waveform is analyzed by the operation terminal 614.

As described above, the optical transmission system as the second exemplary embodiment of the present invention is further provided with the operation terminal 614 and the supervisory signal interfacing units 610 to 613. Therefore, level variation waveform stored in the memory of the optical amplifiers 602 to 605 can be administrated easily and can also be extracted easily to the outside.

Figure 9:
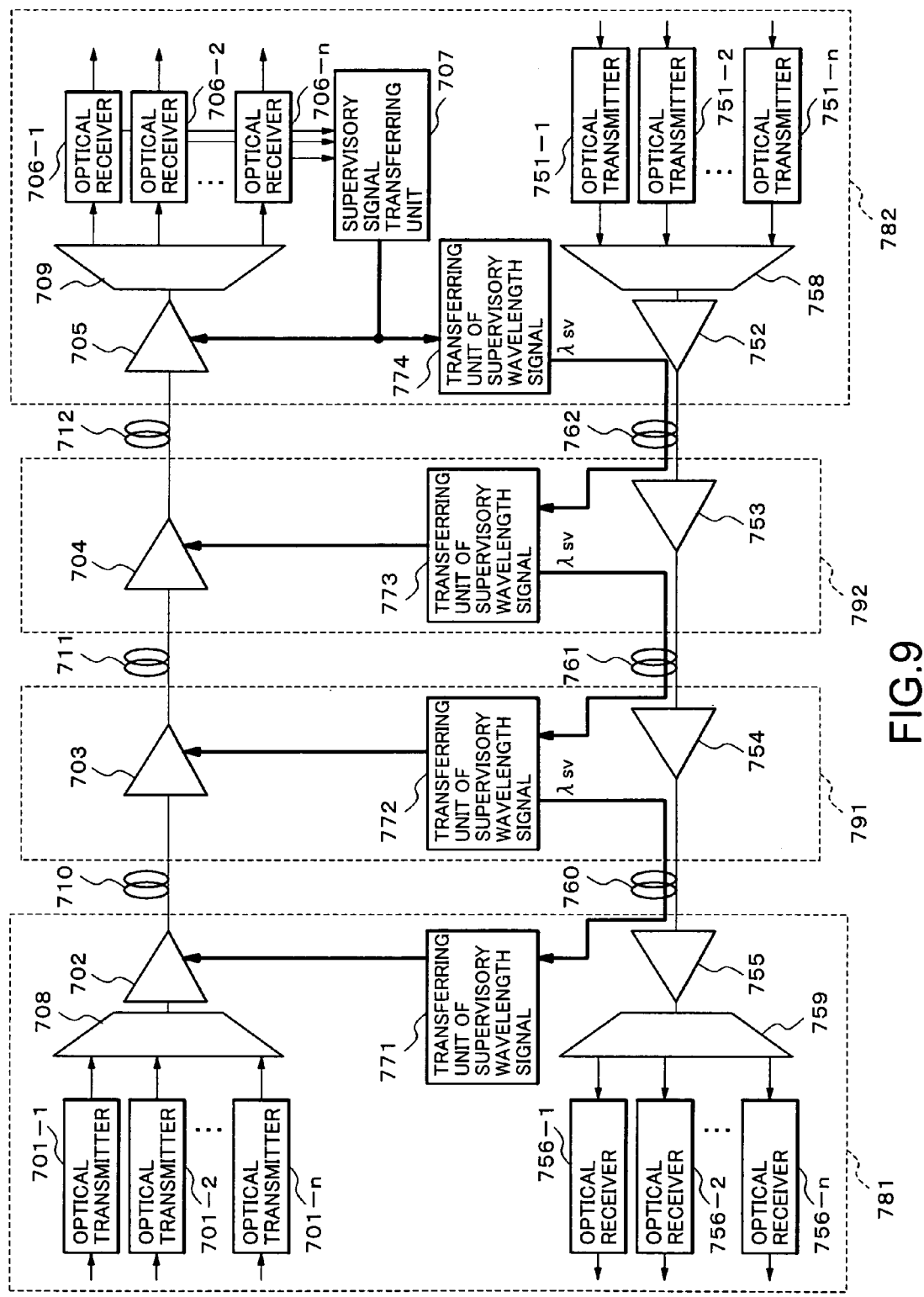
FIG. 9 is a structural diagram illustrating a third exemplary embodiment of the present invention.

A structure of the optical transmission system as a third exemplary embodiment is illustrated in FIG. 9.

In the first exemplary embodiment of the present invention, the supervisory signal transferring route 113 is used, as illustrated in FIG. 3, as a means for notifying the supervisory signal (information of quality deterioration) to the optical amplifiers 102 to 105 from the supervisory signal transferring unit 107. A structure of the optical transmission system as the third exemplary embodiment is an example of using the other means.

FIG. 9 illustrates the optical transmission system of the point-to-point system, comprising optical transmitters 701-1 to 701-n, optical amplifiers 702 to 705 as an example of the optical repeating apparatus, optical receivers 706-1 to 706-n, a supervisory signal transferring unit 707, a wavelength multiplexer 708, a wavelength demultiplexer 709, optical fiber transmission lines 710 to 712, optical transmitters 751-1 to 751-n, optical amplifiers 752 to 755 as an example of the optical repeating apparatus, optical receivers 756-1 to 756-n, a wavelength multiplexer 758, a wavelength demultiplexer 759, optical fiber transmission lines 760 to 762, and transferring units of supervisory wavelength signal 771 to 774. Numerals 781, 782 designate optical line terminals and 791, 792, optical repeaters.

Next, operations of the optical transmission system as the third exemplary embodiment of the present invention will be described with reference to FIG. 9. Transmission of optical signals is conducted in the same manner as that of the first exemplary embodiment. The optical signals transmitted from the optical transmitters 701-1 to 701-n of the optical line terminal 781 are received with the optical receivers 706-1 to 706-n of the optical line terminal 782.

Meanwhile, in the opposite line side, the optical signals transmitted from the optical transmitters 751-1 to 751-n of the optical line terminal 782 are received with the optical receivers 756-1 to 756-n of the optical line terminal 781. The optical signals transmitted from the optical transmitters 701-1 to 701-n are detected in quality deterioration with the optical receivers 706-1 to 706-n. The supervisory signal (information of quality deterioration) detected thereby is transferred to the transferring unit 774 of supervisory wavelength signal via the supervisory signal transferring unit 707.

Here, the supervisory signal is converted to the optical signal of the wavelength which is set for the supervisory signal and is then outputted to the optical amplifier 752 in the opposite line side provided in the optical line terminal 782. This supervisory optical signal is wavelength-multiplexed with the principal optical signals in the optical amplifier 752. The wavelength of this supervisory optical signal is different from the wavelengths outputted from the optical transmitters 751-1 to 751-n. Next, this supervisory optical signal is transmitted to the optical amplifier 753 via the optical fiber transmission line 762. Here, only the wavelength for supervisory signal is demultiplexed and the supervisory optical signal is outputted to the transferring unit of supervisory wavelength signal 773.

Thereafter, this supervisory optical signal is sent as the supervisory information to the optical amplifier 704 from the transferring unit of supervisory wavelength signal 773. The supervisory optical signal may also be transmitted after conversion to the electrical signal from the optical signal as required while it is transmitted to the optical amplifier 704 from the optical amplifier 753. Moreover, the transferring unit of supervisory wavelength signal 773 returns again the supervisory signal transferred as the supervisory optical signal to the optical amplifier 753 as in the case of the transferring unit of supervisory wavelength signal 774. This supervisory signal is wavelength-multiplexed with the principal optical signals and is then transmitted to the next optical amplifier 754. Similar operations are repeated subsequently.

As described above, the opposite line is used to transfer the supervisory signal in the third exemplary embodiment of the present invention. With use of the opposite line, the supervisory signal is transferred to all optical amplifiers. Accordingly, effective transfer of the supervisory information can be realized by effectively using the opposite line in the optical transmission system as the third exemplary embodiment of the present invention. In regard to the supervising method, it is similar to that of the first exemplary embodiment of FIG. 3.

Figure 10:
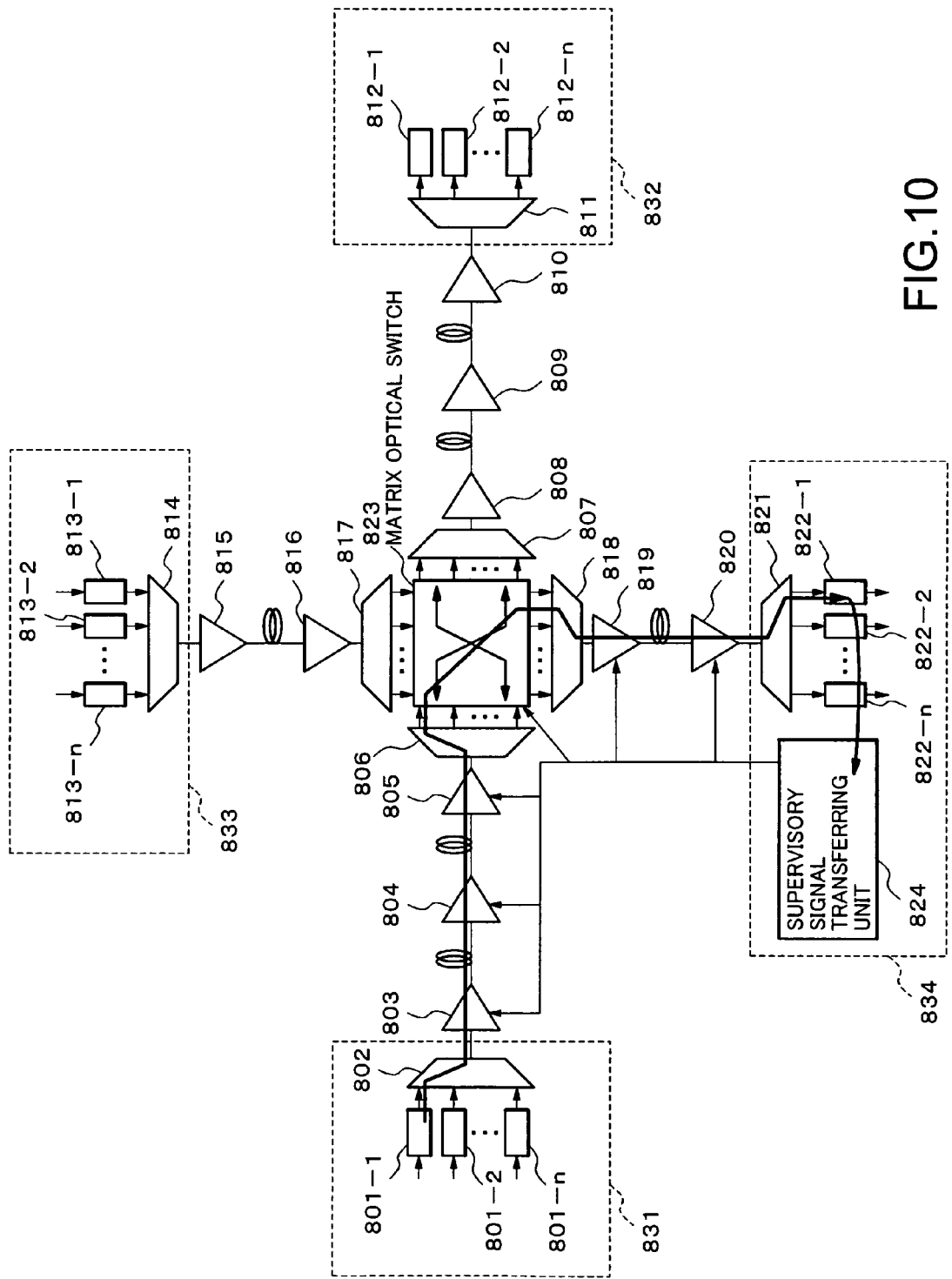
FIG. 10 is a structural diagram illustrating a fourth exemplary embodiment of the present invention.

A structure of the optical transmission system as a fourth exemplary embodiment of the present invention is illustrated in FIG. 10.

This optical transmission system of FIG. 10 includes optical transmitters 801-1 to 801-n, a wavelength multiplexer 802, optical amplifiers 803 to 805, a wavelength demultiplexer 806, a wavelength multiplexer 807, optical amplifiers 808 to 810, a wavelength demultiplexer 811, optical receivers 812-1 to 812-n, optical transmitters 813-1 to 813-n, a wavelength multiplexer 814, optical amplifiers 815 to 816, a wavelength demultiplexer 817, a wavelength multiplexer 818, optical amplifiers 819 to 820, a wavelength demultiplexer 821, optical receivers 822-1 to 822-n, a matrix optical switch 823, and a supervisory signal transferring unit 824. Numerals 831 to 834 designate optical line terminals.

Next, operations of the optical transmission system of the fourth exemplary embodiment of the present invention will be described with reference to FIG. 10.

FIG. 10 shows an application example, where the optical cross-connect function is added to the optical transmission system of the first exemplary embodiment of FIG. 3. The supervisory signal (information of quality deterioration) detected in the receiving end is transferred to the route with which the relevant signal has been transmitted. Level variation waveforms of the optical amplifiers and matrix optical switch are detected at respective points. The optical signals transmitted from the optical transmitters 801-1 to 801-n are wavelength-multiplexed in the wavelength multiplexer 802 as in the case of FIG. 3. The optical signals are then sequentially compensated about the intensity of amount attenuated by the transmission loss with the optical amplifiers 803 to 805. These optical signals are transmitted to the wavelength demultiplexer 806.

Next, the optical signals demultiplexed into the single wavelength with the wavelength demultiplexer 806 are then transmitted through the switching of routes with the matrix optical switch 823.

In an example of FIG. 10, the optical signal transmitted from the optical transmitter 801-1 is switched to the route in the lower side. This optical signal is wavelength-multiplexed again with the optical signals of the other wavelength in the wavelength multiplexer 818. The optical signals are then sequentially compensated about the intensity of amount attenuated by transmission loss in the optical amplifiers 819 to 820. The optical signals are transmitted to the wavelength demultiplexer 821. The optical signal demultiplexed to the single wavelength in the wavelength demultiplexer 821 is received with the optical receiver 822-1. The optical signal received with the optical receiver 822-1 is detected in its quality deterioration.

The supervisory signal based on such detection of quality deterioration is transferred to the optical amplifiers 803 to 805, 819, 820 and the matrix optical switch 823 respectively via the supervisory signal transferring unit 824. A detecting method of quality deterioration and supervising method of optical transmission system are identical to those of the first exemplary embodiment.

As described above, the optical cross-connect function is added in the fourth exemplary embodiment of the present invention. Accordingly, even in the optical transmission system formed like a mesh, defective area or the like can be identified easily.

The present invention is particularly effective for application of the optical amplifiers. Therefore, the present invention can naturally be applied to metro-type optical transmission system as well as the long-distance-type optical transmission system. Particularly, in the case of the metro-type optical transmission system, it is possible to allocate optical apparatus (optical amplifier or optical repeater, or the like) and optical fiber in the users' premises. Therefore, it is assumed that unexpected accident such as increase in loss due to the bending of optical fiber may often occur. From such view point, the present invention which is aimed at easily identifying the defective area is surely effective for all optical transmission systems including the long-distance-type optical transmission system and metro-type optical transmission system.

As described above, the optical transmission system, optical repeating apparatus and quality supervising method of the present invention assure the following exemplary advantages.

First, a level variation showing quality deterioration can surely be identified because level variation is stored in the shorter interval than momentary level variation generated in the optical transmission system.

Secondly, a defective area or section can be identified easily because the information of level variation is stored in each optical repeating apparatus (optical amplifier, as an example).

Thirdly, an amount of storage of the level variation storing unit (memory, as an example) can be reduced because the information of level variation is stored for a limited period from storage of the information of level variation regarding a certain optical signal until transfer of the information of quality deterioration regarding the same optical signal which is detected with an optical receiver to the optical repeating apparatus.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, the inventor's intent is to remain all equivalents of the claimed invention even if the claims are amended later during prosecution.

What is claimed is:

1. An optical transmission system, comprising:
   an optical fiber transmission line;
   one or more optical repeating apparatuses;
   an optical receiving apparatus; and
   a transferring means for transferring a supervisory signal, based on a quality deterioration of an optical signal detected by said optical receiving apparatus, to said optical repeating apparatus from said optical receiving apparatus, wherein
   at least one of said optical repeating apparatuses comprises:
      an optical level variation detecting unit configured to detect a level variation of an optical signal;
      a supervisory and control unit configured to supervise level variation and transmit it as the level variation information; and
      a level variation storing unit configured to store information based on the level variation;
   said optical receiving apparatus comprises:
      a quality deterioration detecting unit configured to detect a quality deterioration of an optical signal, and wherein
   said supervisory and control unit comprises:
      circuitry configured to make said level variation storing unit sequentially discard the information of the level variation having passed a predetermined period while storing the information of the level variation in a constant interval; and
      circuitry configured to make said level variation storing unit hold storage of the information of the level variation from a time when said level variation storing unit has stored the information of the level variation based on a particular optical signal detected by said optical level variation storing unit until a time when said level variation storing unit is controlled by the supervisory signal transferred by said transferring means.

2. The optical transmission system according to claim 1, wherein said transferring means comprises a supervisory signal transferring route for transferring the supervisory signal to said optical repeating apparatus from said optical receiving apparatus.

3. The optical transmission system according to claim 2, wherein said transferring means comprises a supervisory signal transferring unit for sending out the supervisory signal to said supervisory signal transferring route.

4. An optical transmission system, comprising:
   one or more optical repeating apparatuses configured to repeat one or more optical signals;
   an optical fiber transmission line configured to transmit the optical signals;
   an optical receiving apparatus configured to receive the optical signals; and
   a supervisory signal transferring route configured to transfer, to said optical repeating apparatuses, a supervisory signal generated on a basis of the optical signals received by said optical receiving apparatus, wherein
   said optical repeating apparatus comprises:
      an optical level variation detecting unit configured to detect a level variation of the optical signals;
      a first supervisory and control unit configured to supervise the level variation and to transmit it as the level variation information; and
      a level variation storing unit configured to store the level variation information; and
   said optical receiving apparatus comprises:
      a quality deterioration detecting unit configured to detect a quality deterioration of the optical signal transmitted by said optical fiber transmission line;
      a second supervisory and control unit configured to supervise quality deterioration and to transmit it as the supervisory signal; and
      a supervisory signal transferring unit configured to transfer the supervisory signal to said first supervisory and control unit from said second supervisory and control unit via said supervisory signal transferring route, and wherein
   said first supervisory and control unit comprises circuitry configured to control a storage of said level variation storing unit on a basis of the supervisory signal; and
   said first supervisory and control unit comprises:
      circuitry configured to make said level variation storing unit sequentially discard the level variation infomiation having passed a predetermined period while storing the level variation information in a constant interval; and
      circuitry configured to make said level variation storing unit store the level variation information from a time when said level variation storing unit has stored the level variation information based on a particular optical signal until a time when said level variation storing unit is controlled by said first supervisory and control unit with the supervisory signal based on the particular optical signal.

5. The optical transmission system according to claim 4, wherein said first supervisory and control unit controls the level variation information stored in said level variation storing unit not to discard but to hold the level variation information at that time on a basis of the supervisory signal received from said supervisory signal transferring route.

6. The optical transmission system according to claim 4, wherein the constant interval is shorter than a time in which a level variation which causes a quality deterioration in the optical transmission system has generated.

7. The optical transmission system according to claim 6, wherein the constant interval ranges from 1 μsec up to 100 msec.

8. The optical transmission system according to claim 4, wherein a storing period of the level variation information in said level variation storing unit is longer than a time adding, for the particular optical signal, a time until quality deterioration is detected in said quality deterioration detecting unit from storage of the level variation information in said level variation storing unit after a detection of level variation in said optical level variation detecting unit and a time until a control of storage of said level variation storing unit by said first supervisory and control unit after transfer of the supervisory signal with said supervisory signal transferring route from a detection of quality deterioration by said quality deterioration detecting unit.

9. The optical transmission system according to claim 4, wherein a storage capacity of the level variation information in said level variation storing unit is larger than a total sum of data of level variation detected within a period adding a time until a detection of quality deterioration by said quality deterioration detecting unit from a storage of the level variation information in said level variation storing unit after a detection of level variation with said optical level variation detecting unit, and a time until a control of storage in said level variation storing unit by said first supervisory and control unit after a transfer of the supervisory signal in said supervisory signal transferring route from a detection of quality deterioration by said quality deterioration detecting unit.

10. The optical transmission system according to claim 4, wherein said first supervisory and control unit is configured to control said optical level variation detecting unit not to transfer new level variation information to said level variation storing unit on a basis of the supervisory signal received from said supervisory signal transferring unit.

11. The optical transmission system according to claim 4, wherein said quality deterioration detecting unit comprises:
an optical level detecting unit configured to detect a level of optical signals; and
a signal quality detecting unit configured to detect a quality of optical signals.

12. The optical transmission system according to claim 11, wherein said signal quality detecting unit detects at least one of a shutdown of the received signal, a frame asynchronization of the received signal, and a bit error of the received signal.

13. The optical transmission system according to claim 4, wherein said level variation storing unit is capable of reading the level variation information from outside.

14. The optical transmission system according to claim 4, wherein said level variation storing unit comprises a memory.

15. The optical transmission system according to claim 14, wherein said memory comprises a primary memory for storing the level variation information for a predetermined period, and a secondary memory for storing the level variation information by shifting it from said primary memory under a control with the supervisory signal with said first supervisory and control unit.

16. The optical transmission system according to claim 4, wherein said optical level variation detecting unit comprises an optical receiver.

17. The optical transmission system according to claim 4, wherein said optical repeating apparatus further comprises an optical amplifying unit.

18. The optical transmission system according to claim 17, wherein said optical repeating apparatus further comprises a status detecting unit configured to detect a status of said optical amplifying unit.

19. The optical transmission system according to claim 18, wherein said first supervisory and control unit supervises the status information of said optical amplifying unit from said status detecting unit, and said level variation storing unit stores the status information of said optical amplifying unit.

20. The optical transmission system according to claim 4, wherein the optical transmission system executes a wavelength multiplex transmission.

21. The optical transmission system according to claim 20, wherein said quality deterioration detecting unit is provided for individual wavelengths.

22. The optical transmission system according to claim 21, further comprising a wavelength demultiplexer configured to demultiplex the wavelength-multiplexed signals to optical signals of individual wavelengths and to input these signals to each said quality deterioration detecting unit.

23. The optical transmission system according to claim 4, further comprising an optical transmitter.

24. The optical transmission system according to claim 23, wherein the optical transmission system executes the wavelength multiplex transmission, and said optical transmitter is provided for individual wavelengths.

25. The optical transmission system according to claim 24, further comprising a wavelength multiplexer configured to multiplex optical signals of individual wavelengths outputted from said optical transmitters.

26. The optical transmission system according to claim 4, further comprising an operation terminal configured to supervise said optical repeating apparatuses.

27. The optical transmission system according to claim 26, further comprising interfacing units configured to couple between said operation terminal and said optical repeating apparatuses.

28. The optical transmission system according to claim 4, wherein an opposite line is used as said supervisory signal transferring route.

29. The optical transmission system according to claim 28, further comprising a transferring unit of said supervisory wavelength signal configured to transmit the supervisory signal to said opposite line.

30. The optical transmission system according to claim 4, further comprising an optical cross-connect function.

31. The optical transmission system according to claim 30, further comprising a matrix optical switch configured to switch said transmission routes.

32. An optical repeating apparatus connected in an optical fiber transmission line, comprising:
an optical level variation detecting unit configured to detect level variation of one or more optical signals;
a supervisory and control unit configured to supervise level variation and transmit it as the level variation information; and
a level variation storing unit configured to store information of the level variation,
wherein said supervisory and control unit comprises circuitry configured to make said level variation storing unit sequentially discard the level variation information having passed a predetermined period while storing the level variation information in a constant interval and to make said level variation storing unit hold the information of the level variation being stored at a time when a supervisory signal is received from outside.

33. An optical repeating apparatus connected in an optical fiber transmission line, comprising:
- an optical level variation detecting unit configured to detect level variation of one or more optical signals;
- a supervisory and control unit configured to supervise level variation and transmit it as the level variation information; and
- a level variation storing unit configured to store the level variation information,
- wherein said supervisory and control unit comprises circuitry configured to make said level variation storing unit sequentially discard the level variation information having passed a predetermined period while storing the level variation information in a constant interval, and said supervisory and control unit comprises circuitry configured to control storage of said level variation storing unit on a basis of the supervisory signal received from outside and to control to hold the level variation information stored in said level variation storing unit at that time when the supervisory signal is received.

34. The optical repeating apparatus according to claim 33, wherein the constant interval is shorter than a time in which a level variation which causes a quality deterioration in the optical transmission system has generated.

35. The optical repeating apparatus according to claim 34, wherein the constant interval ranges from 1 μsec to 100 msec.

36. The optical repeating apparatus according to claim 33, wherein said supervisory and control unit is configured to control not to transfer the new level variation information to said level variation storing unit from said optical level variation detecting unit on a basis of the supervisory signal received from outside.

37. The optical repeating apparatus according to claims 33, wherein said level variation storing unit is capable of reading the level variation information from the outside.

38. The optical repeating apparatus according to claim 33, wherein said level variation storing unit comprises a memory.

39. The optical repeating apparatus according to claim 38, wherein said memory includes a primary memory configured to store the level variation information for a predetermined period, and a secondary memory configured to store the level variation information by shifting it from said primary memory under a control of said supervisory and control unit with the supervisory signal.

40. The optical repeating apparatus according to claim 33, wherein said optical level variation detecting unit comprises an optical receiver.

41. The optical repeating apparatus according to claim 33, further comprising an optical amplifying unit.

42. The optical repeating apparatus according to claim 41, further comprising a status detecting unit configured to detect a status of said optical amplifying unit.

43. The optical repeating apparatus according to claim 42, wherein said supervisory and control unit supervises the status information of said optical amplifying unit from said status detecting unit, and said level variation storing unit stores the status information of said optical amplifying unit.

44. The optical repeating apparatus according to claim 33, further comprising an operation terminal configured to supervise said optical repeating apparatuses.

45. The optical repeating apparatus according to claim 44, further comprising interfacing units configured to couple between said operation terminal and said optical repeating apparatuses.

46. The optical transmission system of claim 1, wherein said level variation of said optical signal that is detected by said optical level variation detecting unit comprises a momentary level variation in a power level of said optical signal, including variations in a range of 1 μsec to 100 msec.

* * * * *